(12) United States Patent
Fushimi et al.

(10) Patent No.: US 7,486,505 B2
(45) Date of Patent: Feb. 3, 2009

(54) CONTROLLER OF MERCHANDISE SALES DATA PROCESSING APPARATUS

(75) Inventors: Kazuhiro Fushimi, Shizuoka (JP); Katsumi Gocho, Shizuoka (JP); Kazumi Kotani, Shizuoka (JP); Norifumi Shishido, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 556 days.

(21) Appl. No.: 11/229,999

(22) Filed: Sep. 19, 2005

(65) Prior Publication Data

US 2006/0086789 A1  Apr. 27, 2006

(30) Foreign Application Priority Data

Sep. 27, 2004 (JP) .............................. 2004-279875

(51) Int. Cl.
*H05K 5/00* (2006.01)
*H05K 7/00* (2006.01)
*H05K 7/16* (2006.01)
*G06F 1/16* (2006.01)

(52) U.S. Cl. ...................... 361/683; 361/684; 361/685; 361/686; 361/724; 361/725

(58) Field of Classification Search ......... 361/683–686, 361/725, 730, 724; 705/16, 17, 21, 26, 27
See application file for complete search history.

(56) References Cited

U.S. PATENT DOCUMENTS

| | | | |
|---|---|---|---|
| 4,909,579 A | | 3/1990 | Liu |
| 5,136,468 A | * | 8/1992 | Wong et al. .................. 361/683 |
| 5,337,464 A | * | 8/1994 | Steffes ....................... 29/401.1 |
| 5,590,024 A | * | 12/1996 | Honda et al. ................. 361/684 |
| 5,600,538 A | * | 2/1997 | Xanthopoulos ............. 361/683 |
| 5,646,820 A | * | 7/1997 | Honda et al. ................. 361/683 |
| 5,754,396 A | * | 5/1998 | Felcman et al. ............. 361/683 |
| 5,774,330 A | * | 6/1998 | Melton et al. ............... 361/683 |
| 5,774,337 A | * | 6/1998 | Lee et al. ..................... 361/725 |
| 5,978,225 A | * | 11/1999 | Kamphuis .................... 361/707 |
| 5,980,003 A | * | 11/1999 | Huang ..................... 312/223.2 |
| 6,049,452 A | * | 4/2000 | You et al. .................... 361/685 |

(Continued)

FOREIGN PATENT DOCUMENTS

DE          200112702 U1    11/2000

(Continued)

*Primary Examiner*—Jayprakash N Gandhi
*Assistant Examiner*—Anthony M Haughton
(74) *Attorney, Agent, or Firm*—Frishauf, Holtz, Goodman & Chick, P.C.

(57) ABSTRACT

A controller of a distributed POS terminal includes a control box frame which stores various hardware components for performing merchandise sales data processing, a top cover which covers an upper face and side faces of a control box frame, and a front cover which covers a front face of the control box frame. The control box frame includes a stepped part at a front portion thereof, such that a front portion of the control box frame is lower than a back portion thereof. When the control box frame is used for the distributed type POS terminal, an additional frame is fixed to the step portion to increase the supporting strength of the top cover. When the control box frame is used for an integrated POS terminal, the stepped part provides a space to place a keyboard.

17 Claims, 10 Drawing Sheets

U.S. PATENT DOCUMENTS

| | | | |
|---|---|---|---|
| 6,055,152 A * | 4/2000 | Felcman et al. | 361/683 |
| 6,205,020 B1 * | 3/2001 | Felcman et al. | 361/683 |
| 6,209,975 B1 | 4/2001 | Lai | |
| 6,272,007 B1 * | 8/2001 | Kitlas et al. | 361/683 |
| 6,452,794 B1 * | 9/2002 | Rumney | 361/686 |
| 6,507,352 B1 * | 1/2003 | Cohen et al. | 715/817 |
| 6,700,777 B2 * | 3/2004 | Chen | 361/685 |
| 6,711,002 B1 * | 3/2004 | Fan | 361/679 |
| 6,721,183 B1 * | 4/2004 | Chen et al. | 361/726 |
| 6,741,459 B2 * | 5/2004 | Imamura | 361/683 |
| 6,999,320 B2 * | 2/2006 | Fan | 361/725 |
| 2002/0034065 A1 * | 3/2002 | Imamura | 361/683 |
| 2006/0187627 A1 * | 8/2006 | Kobayashi | 361/683 |

FOREIGN PATENT DOCUMENTS

| | | |
|---|---|---|
| EP | 0459231 A2 | 4/1991 |
| JP | 8-204353 A | 8/1996 |
| JP | 82-04353 A | 8/1996 |

* cited by examiner

CONTROLLER OF MERCHANDISE SALES DATA PROCESSING APPARATUS

CROSS-REFERENCE TO RELATED APPLICATION

The present application is based on and claims the benefit of priority of Japanese Patent Application P2004-279875 filed on Sep. 27, 2004, the entire contents of which are incorporated herein by reference.

BACKGROUND OF THE INVENTION

1. Field of the Invention

The invention relates to a controller of a merchandise sales data processing apparatus.

2. Description of Related Art

Merchandise sales data processing apparatuses such as a POS terminal, and so on, can be broadly classified as either a distributed type apparatus or an integrated type apparatus. The distributed type apparatus has a controller, a keyboard, a display, a printer, and so on, which are separated in a configuration to constitute a merchandise sales data processing apparatus. Meanwhile, the integrated type apparatus has integrated components to constitute a merchandise sales data processing apparatus.

Commonly, when the distributed type apparatus is used, the controller is hidden under a counter, for example, on which the apparatus is placed. Thus, it is required for the controller to be short in length and depth to be fit into a given space.

On the other hand, it is required for the integrated type apparatus, especially the keyboard part thereof, to be short in height, in order to satisfy demands such that an operator of short stature be able to operate the apparatus, or that an oppressive feeling on a counter be reduced.

As explained above, the requirements for the distributed type apparatus and for the integrated type apparatus are different. Therefore, they are often considered to be completely different products, and it is common that their configurations are designed separately.

The controller, however, basically executes the same processing in both the distributed type apparatus and in the integrated type apparatus. The processing is controlled by hardware components for performing merchandise sales data processing, such as a motherboard, which contains a CPU, a memory, and so on, various extension boards, a HDD, a power unit, an Uninterruptible Power Supply (a UPS), and so on. Thus, if these components are standardized between the distributed type apparatus and the integrated type apparatus, it would bring many benefits. For example, a reduction in the number of components, rationalization of manufacturing processes, and so on, could be realized.

Japanese Laid-Open Publication No. Hei 08-204353 discloses an electronic apparatus, which improves assembly workability, maintenance workability and reduces the number of the components which constitute a housing of the electronic apparatus.

However, the distributed type apparatus and the integrated type apparatus require different configurations. Thus, it is common that completely different frame structures are used as control box frames for storing and holding the hardware components. Consequently, layouts of the hardware components to be stored in the control box frame or wiring designs of the motherboards are completely different in the distributed type apparatus and the integrated type apparatus.

The object of the present invention is to standardize some parts between the distributed type merchandise sales data processing apparatus and the integrated merchandise sales data processing apparatus.

SUMMARY OF THE INVENTION

According to one aspect of the present invention, a controller of a distributed type merchandise sales data processing apparatus (for example, a POS terminal) is provided which includes: (i) a control box frame having a frame structure, and having a stepped part such that a front portion of the control box frame is lower than a back portion of the control box frame, (ii) a hardware component (for example, a motherboard mounting a CPU or memory, various extension boards, a HDD, a power unit, a UPS, and so on) stored in the control box frame, for performing merchandise sales data processing, (iii) an additional frame detachably fixed to the stepped part, for making uniform a height of the front portion of the control box frame extending to a top of the additional frame and a height of the back portion of the control box frame, (iv) a top cover detachably fixed to cover an upper face and side faces of the control box frame, and (v) a front cover detachably fixed to cover a front face of the control box frame. An optical disk drive, a fan, a speaker, and so on can be provided in the additional frame.

In addition, according to the present invention, a controller structure of a merchandise sales data processing apparatus is provided which includes: (i) a control box frame having a frame structure and including a stepped part such that a front portion of the control box frame is lower than a back portion of the control box frame; and (ii) at least one hardware component stored in the control box frame, for performing merchandise sales data processing. The controller structure is adapted for use both in a controller of a distributed type merchandise sales data processing apparatus and in an integrated type merchandise sales data processing apparatus.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described with reference to FIGS. 1 to 10.

A distributed type merchandise sales data processing apparatus will be described with reference to FIGS. 1 to 4.

Figure 1:
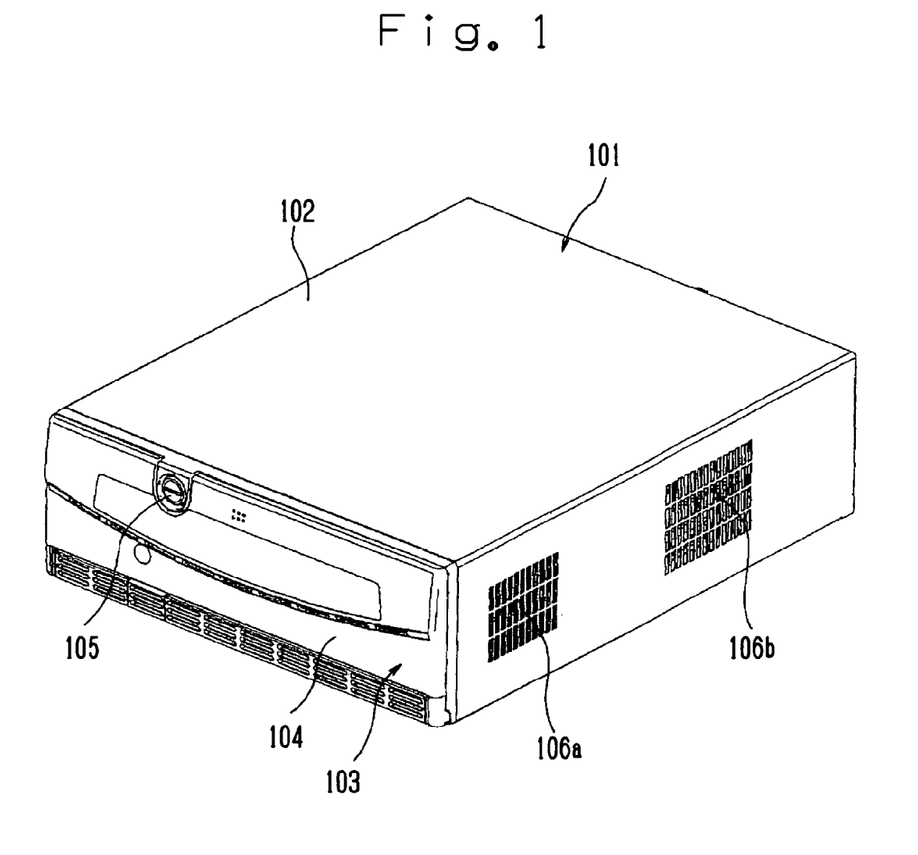
FIG. 1 is a perspective view showing a controller of a distributed type POS terminal of an embodiment of the present invention.

FIG. 1 is a perspective view showing a controller 101 of a distributed type merchandise sales data processing apparatus, which is a POS terminal according to this embodiment of the present invention. The controller 101 has a structure that a length and a width thereof are longer than a height thereof and is covered with a top cover 102 and a front cover 103. A key 105 for opening and closing a lid 104, which is capable of freely opening and closing with respect to a front part of the front cover 103, is provided to the front cover 103. Two exhaust openings 106a and 106b are formed in a right side from an anterior view of the top cover 102.

Figure 2:
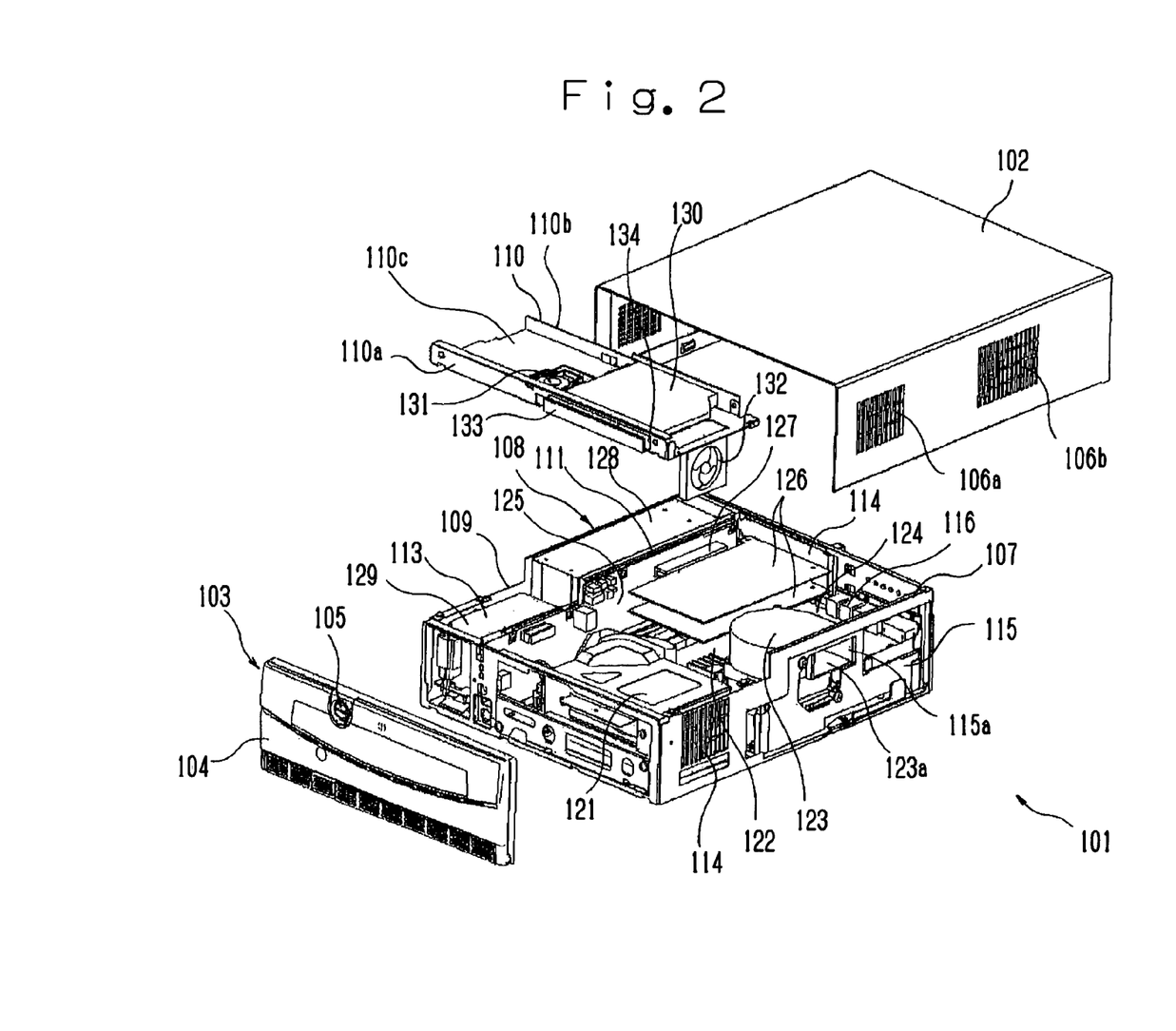
FIG. 2 is an exploded perspective view showing the controller of the distributed type POS terminal of the embodiment of the present invention.
Figure 3:
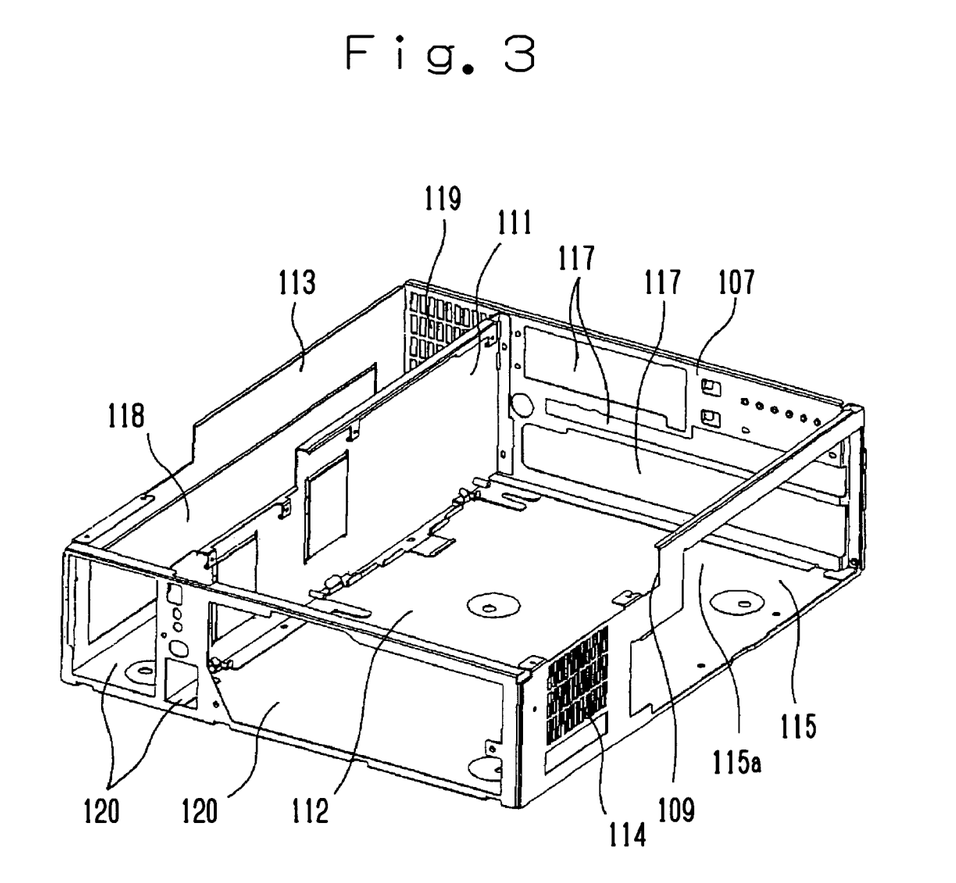
FIG. 3 is a perspective view showing a control box frame.

FIG. 2 is an exploded perspective view of the controller 101 of the distributed type POS terminal. FIG. 3 is a perspective view of the control box frame 107. The controller 101 includes the control box frame 107 for storing hardware components 108 and an additional frame 110 provided to a stepped part 109. A top cover 120 is fixed to cover an upper face and side faces of the control box frame 107, and a front cover 103 is fixed to cover a front face of the control box frame 107. The stepped part 109 is formed by notching the control box frame 107 in such a manner that a front portion of the control box frame 107 is lower than the back portion of the control box frame 107.

The control box frame 107 has a frame structure such that a length and a width thereof are longer than a height thereof. The control box frame 107, as shown in FIG. 3, is partitioned by a partition 111 so as to be divided into a right side space and a left side space (from an anterior view) at a proportion of from three to one, to four to one. For the sake of convenience, the right side of the space divided by the partition 111 is referred to as a right space 112, and the left side of the space divided by the partition 111 is referred to as a left space 113. A notched portion is formed in order to form a stepped part 109 on the partition 111.

An exhaust opening 114 is formed at a front part of a right side wall of the right space 112. A motherboard storing opening 115 for assembling a motherboard is formed in the other part of the right side wall of the right space 112. One portion of the motherboard storing opening 115 is also used as a second exhaust opening 115a. At a back wall of the right space 112 of the control box frame 107, a plurality of connector openings 117 are formed for exposing various connector 116 to outside.

A cooling opening 118 is formed in a left side wall of the left space 113 of the control box frame 107, and a third exhaust opening 119 is formed in a back wall of the left space 113. Also, various openings 120 are formed in a front wall of the control box frame 107.

The hardware components 108 will now be explained. At the right space 112 of the control box frame 107, a HDD 121 is placed at a front portion of the control box frame 107, and the motherboard 122 is placed behind the HDD 121 near a bottom face of the control box frame 107. The motherboard 122 contains a CPU (not shown), a memory, and so on. Since the CPU is a heat source, a second fan 123 is fixed above the CPU. The second fan 123 has an exhaust opening 123a which is placed opposite to the second exhaust opening 115a, which is also used as a portion of the motherboard storing opening 115. The motherboard 122 is detachably stored in the control box frame 107 via the motherboard storing opening 115.

A connector board 124 is fixed to a back wall of the right space 112 of the control box frame 107. The connector board 124 has a plurality of connectors 116.

At the right space 112 of the control box frame 107, a connection board 125 is fixed at a wall of the partition 111. The connection board 125 is connected to the connectors 116, the HDD 121, and so on, via a lead wire (not shown), to connect with the CPU, which is mounted on the motherboard 122. To enable the connection to the CPU, connectors (not shown), which are needed when the motherboard is mounted on the control box frame 107, are provided to the motherboard 122 and the connection board 125. Further, a plurality of extension board connectors 127 are provided at the connection board 124 for receiving extension boards 126, and a plurality of the extension boards 126 are inserted into the extension board connectors 127. The extension boards 126 inserted into the extension board connectors 127 are connected with the CPU, which is mounted on the motherboard 122, via the connection board 125.

In the control box frame 107, a power unit 128 is stored in the back of the left space 113, and an uninterruptible power supply system (UPS) 129 is positioned at a front side of the left space 113. Due to the arrangement of the power unit 128 as a heat source, heat is generated. It is therefore necessary to let the heat to escape from the left space 113. At a back wall of the control box frame 107, a third fan is fixed at a position where the third exhaust opening 119 is formed so that the heat can be released from the left space 113 by operation of the third fan. In addition, the heat exhausted from the power unit 128 can be also released from the cooling opening 118 of the control box frame 107.

One portion of the power unit 128 is divided to be arranged between the HDD 121 and the connection board 125 at a front part of the right space 112 of the control box frame 107 (not shown in FIG. 2)

The various hardware components 108 as explained above are arranged not to extend into an upper space above the stepped part 109, which forms a lower front portion and a higher back portion in the control box frame 107. As shown in FIG. 2, the second fan 123, one portion of the connection board 125, the extension boards 126, and the power unit 128 are arranged at the higher back portion so that these components are placed higher than the lower front portion. Meanwhile, the HDD 121 and the UPS 129 are arranged at the lower front portion so that these components are placed lower than the back portion of the control box frame 107.

The additional frame 110 will now be explained. Longitudinal end portions 110a and 110b of the additional frame 110 are bent upwardly so that a space 110c is formed therebetween. The additional frame 110 is fixed to the stepped part 109 of the control box frame 107 to make the heights of a front end of the lower front portion of the control box frame 107 and the back portion of the control box frame 107 uniform by the end portion 110a.

An optical disk drive 130 and a speaker 131 are positioned in the space 110c in the additional frame 110. A first fan 132 is fixed to extend downwardly from a right side bottom of the additional frame 110. The optical disk drive 130 is a CD-ROM drive, for example, and is fixed in such a manner that a tray 133, on which an optical disk is placed, is loaded/unloaded horizontally in the direction of coming out from/going in to the front face of the control box frame 107. At the front side end portion 110a of the additional frame 110, a release part 134 for the end portion 110a is formed in order not to interfere the tray 133 during a loading operation. The first fan 132 is fixed at a position where the exhaust opening 114 is formed in a right wall of the right space 112 when the additional frame 110 is fixed to the stepped part 109 of the control box frame 107.

Figure 4:
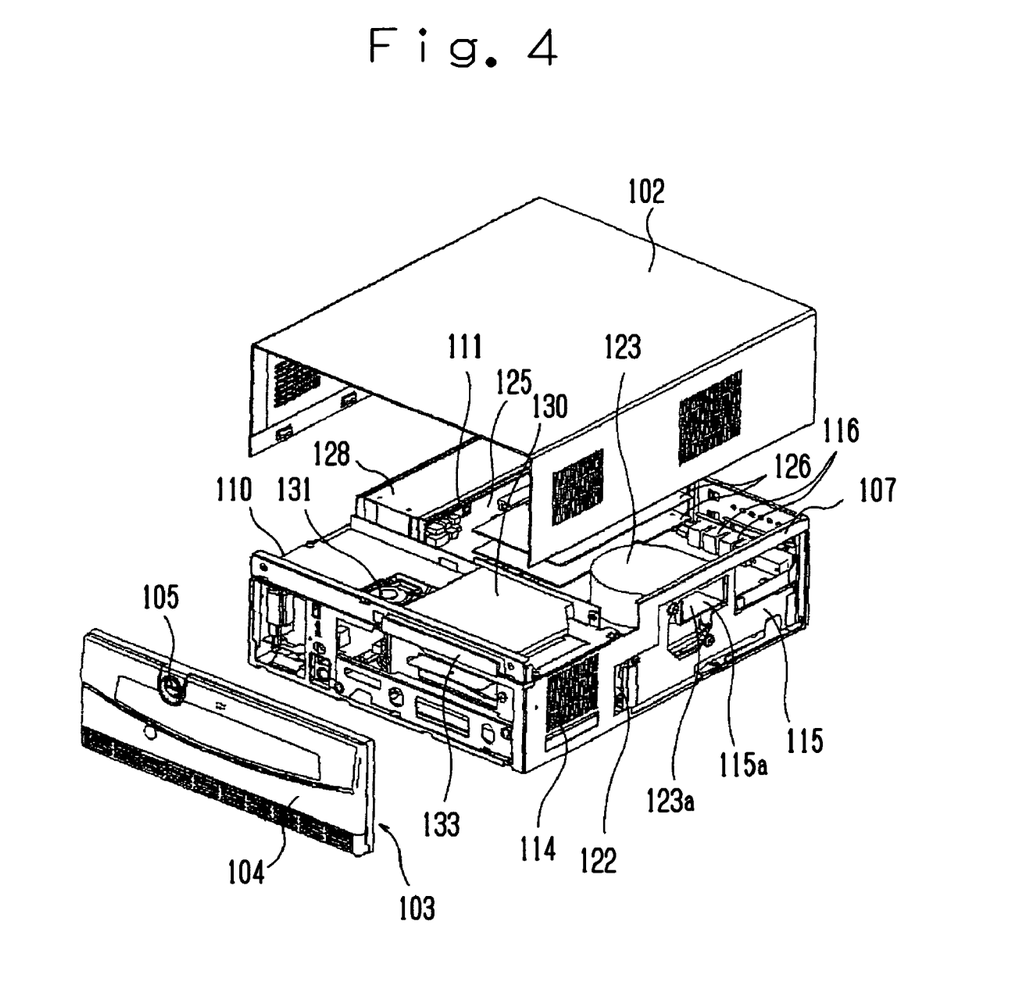
FIG. 4 is an exploded perspective view showing a status of fixing a top cover and a front cover to the control box frame, in which hardware components have been stored, and to which an additional frame has been coupled.

FIG. 4 is an exploded perspective view showing a status of fixing the top cover 102 and the front cover 103 to the control box frame 107, in which the hardware components 108 have been stored, and to which the additional frame 110 has been fixed. The top cover 102 is fixed to the control box frame 107 from a top face. The top cover 102 covers the top face and both side faces of the control box frame 107. The front cover 103 is fixed on a front part of the control box frame 107 to cover the front face of the control box frame 107.

An integrated merchandise sales data processing apparatus will be described with reference to FIGS. 5 to 10.

Figure 5:
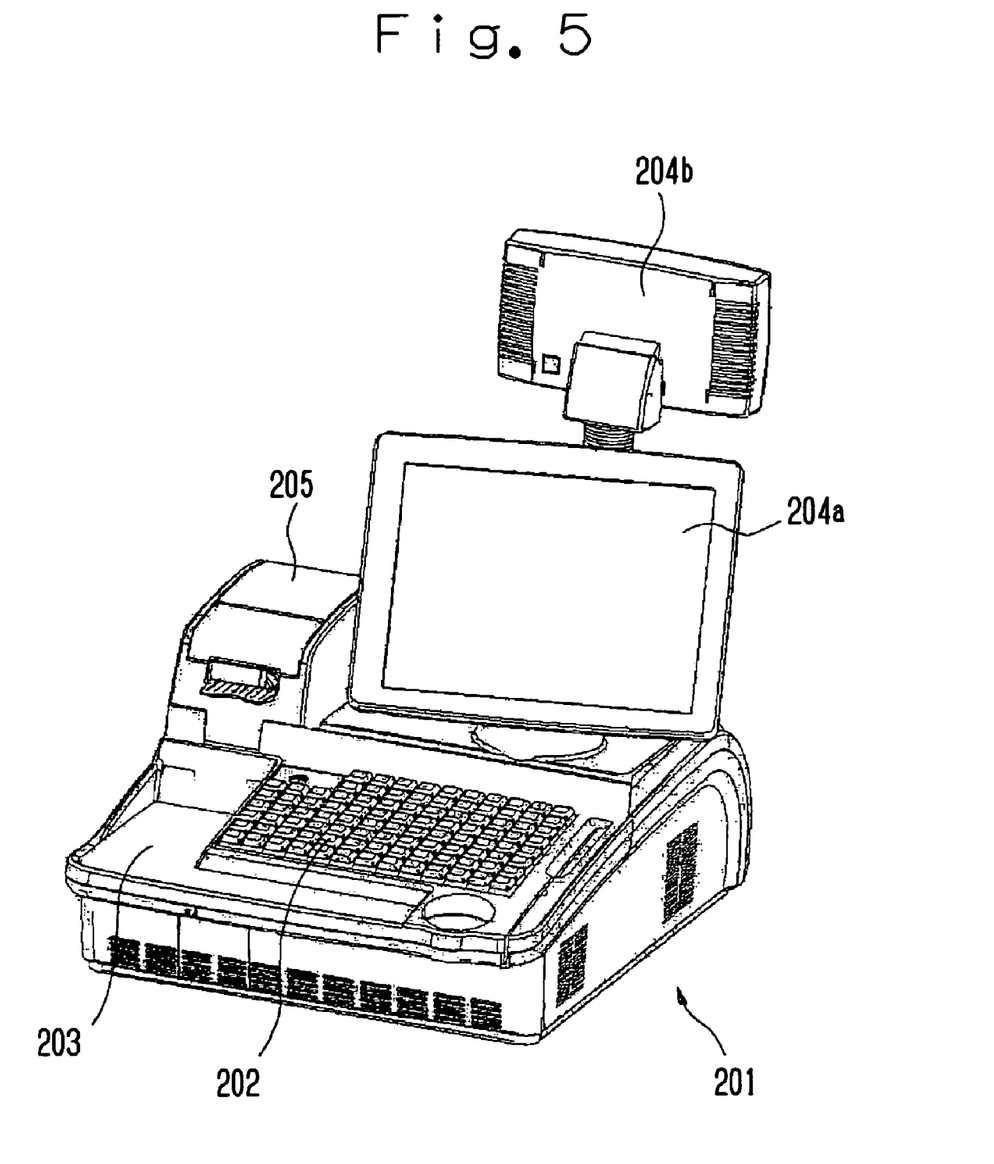
FIG. 5 is a perspective view showing an integrated POS terminal.

FIG. 5 is a perspective view showing an integrated merchandise sales data processing apparatus, which is a POS terminal 201 in the present embodiment. The integrated POS terminal 201 contains a keyboard 202 at a front right side, a paper money placing part 203 at a front left side, displays 204a and 204b for operators and for customers at a right back side, and a printer 205 at a left back side.

Figure 6:
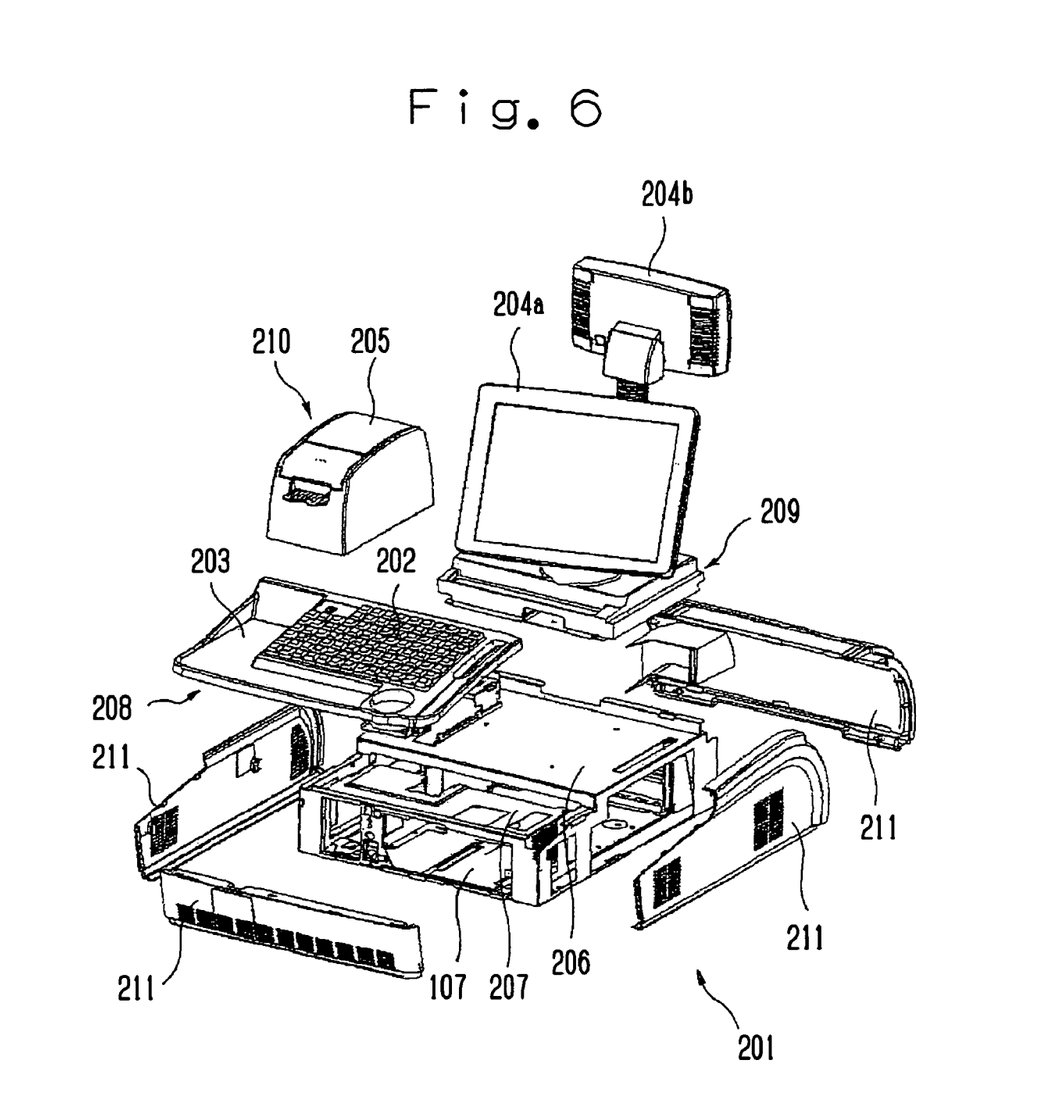
FIG. 6 is an exploded perspective view showing the integrated POS terminal.

FIG. 6 is an exploded perspective view showing the POS terminal 201. The POS terminal 201 has a main frame 206 to hold each part. The main frame 206 is a frame structure such that a length and a width thereof are longer than a height thereof and has a second stepped part 207, such that a front portion of the main frame 206 is lower than the back portion of the main frame 206. The control box frame 107 is stored in the main frame 206. The keyboard 202 and the paper money placing part 203 are formed integrally to constitute a keyboard unit 208, and are fixed at an upper portion of the second stepped part 207. The displays 204a and 204b for operators and for customers at the right back side are formed integrally to constitute a display unit 209, and are fixed at an upper portion of the main frame 206, but not at the second stepped part 207. The printer 205 is fixed to a position adjacent to the display unit 209 at an upper portion of the main frame 206, but not at the second stepped part 207. Further, a front face, a back face, and both side faces of the main frame 206 are respectively covered with four detachable decorative covers 211.

Figure 7:
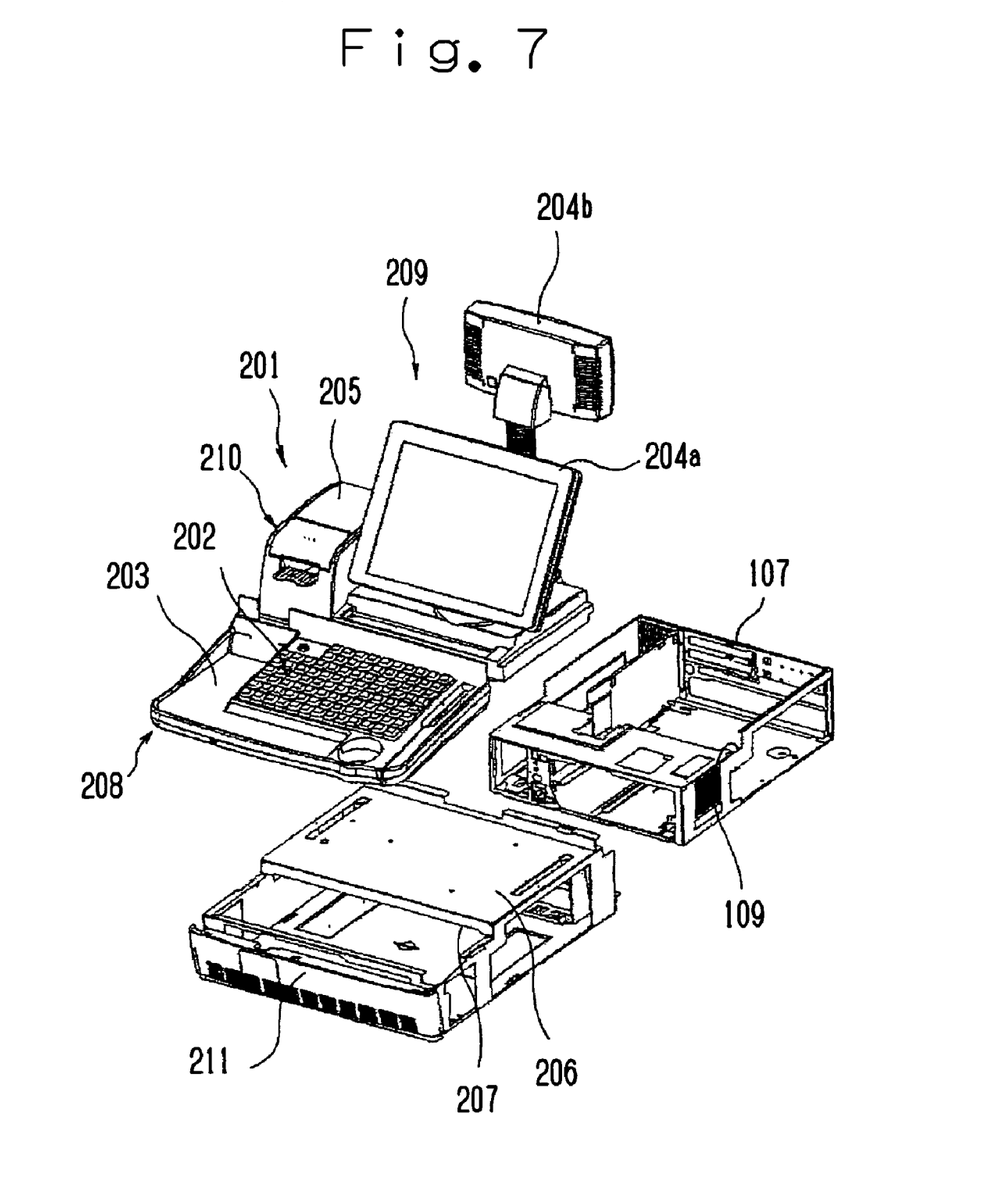
FIG. 7 is an exploded perspective view showing a status of storing a control box frame in a main frame, which supports a keyboard unit, a display unit, and a printer unit.
Figure 8:
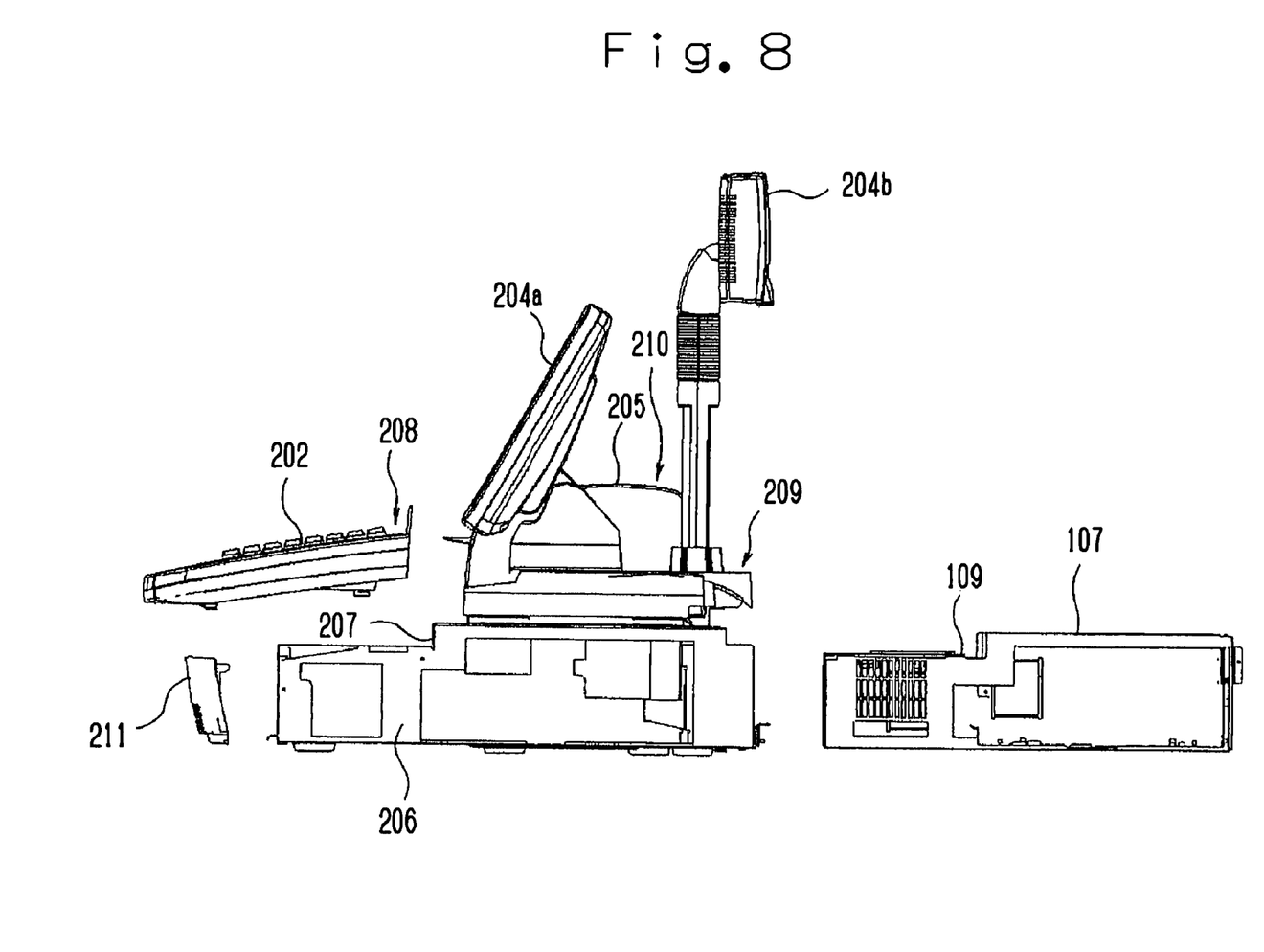
FIG. 8 is a side view showing a status of storing the control box frame in the main frame, which supports the keyboard unit, the display unit, and the printer unit.

FIG. 7 is an exploded perspective view showing a status of storing the control box frame 107 in the main frame 206, which holds the keyboard unit 208, the display unit 209, and the printer unit 210. FIG. 8 is a side view thereof. The control box frame 107 is stored in the main frame 206 from the back such that the stepped part 109 is positioned at the second stepped part 207 of the main frame 206 when the control box frame 107 is stored in the main frame 206. The control box frame 107 may be freely removed from the main frame 206.

Figure 9:
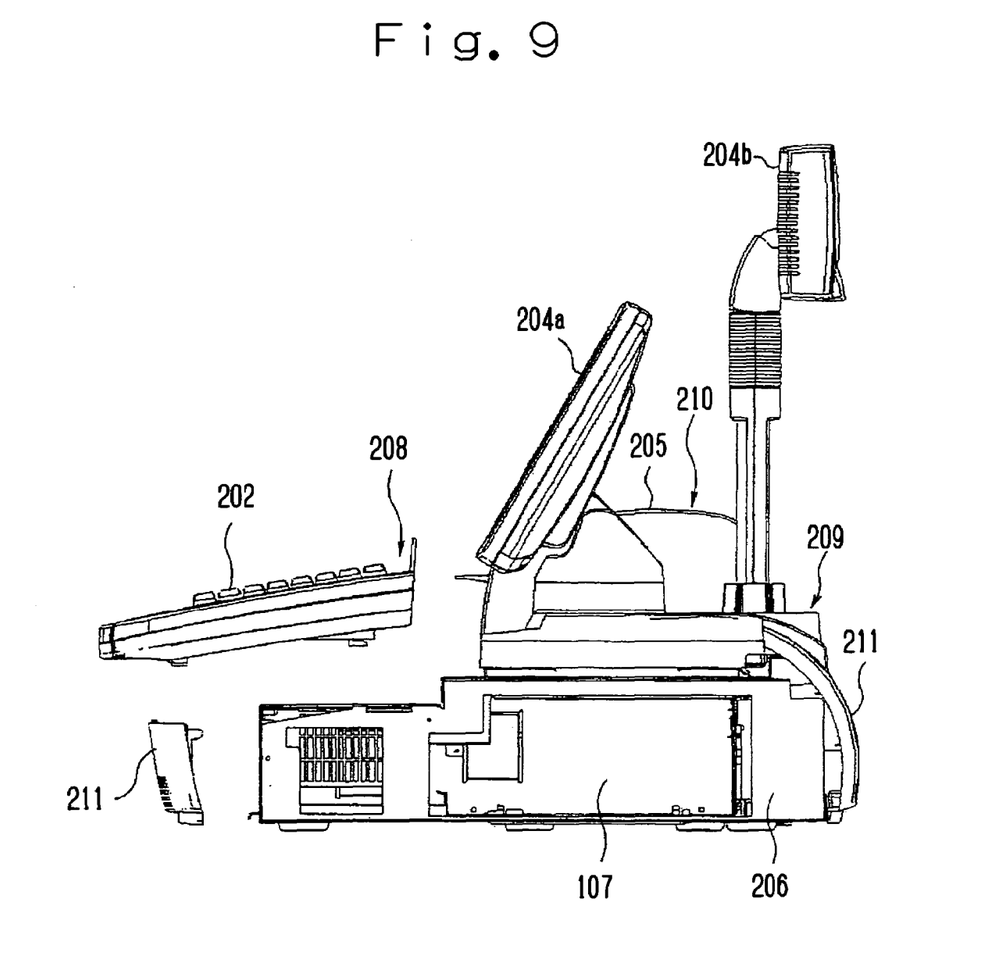
FIG. 9 is a side view showing a status of attaching the keyboard unit and a front decorative cover to the main frame, to which the control box frame has been stored.

FIG. 9 is a side view showing a status of fixing the keyboard unit 208 and the front decorative cover 211 to the main frame 206, in which the control box frame 107 has been stored. As shown in FIG. 9, the integrated POS terminal 201 can be assembled by storing the control box frame 107 in the main frame 206, then fixing the keyboard unit 208 and the front decorative cover 211 to the main frame 206, and then the both side decorative covers 211 to the main frame 206.

Figure 10:
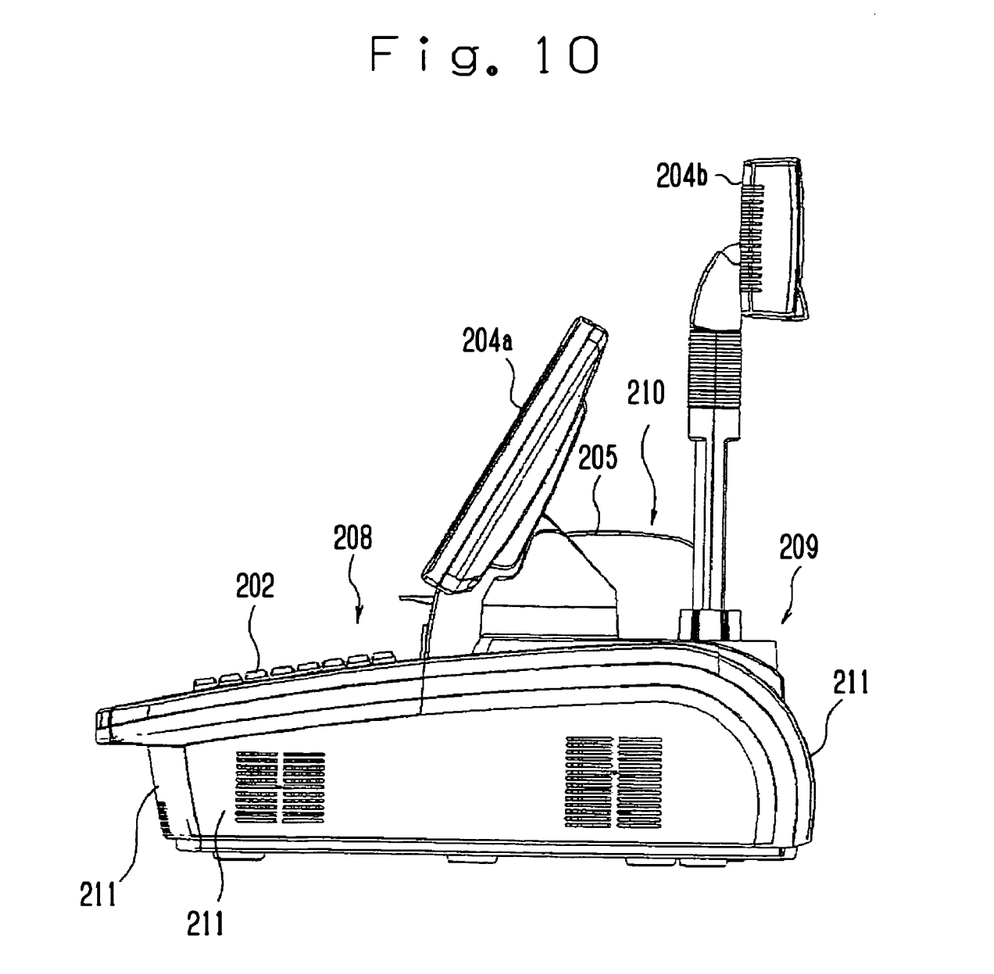
FIG. 10 is a side view showing the integrated POS terminal.

FIG. 10 is a side view showing the completed integrated POS terminal 201.

In FIGS. 7 to 9, a control box frame 107 in which the hardware components 108 are not stored is shown for the explanation of the integrated POS terminal 201, but in an actual manufacturing process, the control box frame 107 for use should be filled with all or some of the hardware components 108.

The between the distributed type apparatus and the integrated type apparatus will now be explained.

According to the embodiments of the present invention, when manufacturing of the controllers of the distributed type POS terminal and of the integrated type POS terminal 201, the control box frame 107 and the hardware components 108 can be used for either type of POS terminal.

Since the stepped part 109 is provided at the control box frame 107, when the control box frame 107 is utilized for the integrated type POS terminal 201, the stepped part 109 (the second stepped part 207 of the main frame 206) can be provided as a placing space for the keyboard 202 (the keyboard unit 208) so that the height of the keyboard 202 can be lowered. Meanwhile, when the control box frame 107 is utilized for the distributed type POS terminal, the height of the front portion of the control box frame 107 and the height of the back portion can be made uniform by fixing the additional frame 110 to the stepped part 109 so that a supporting strength of the top cover 102 can be maintained. Namely, according to the embodiment of the present invention, the control box frame 107 can be designed to satisfy a structural demand for the controller 101 of the distributed type POS terminal such as a demand that the controller should be short in width and length, and that a placing space should be small. Meanwhile, a structural demand for the integrated POS terminal 201 such as a demand that the height of the keyboard should be low can be also satisfied. The demand can be realized by providing the stepped part 109 (the second stepped part 207 of the main frame 206) as the placing space for the keyboard 202 (the keyboard unit 208) when the control box frame 107 is utilized for the integrated type POS terminal 201.

Consequently, not only the control box frame 107, but also the hardware components 108 which are stored in the control box frame 107 can be standardized between the distributed type POS terminal and the integrated type POS terminal.

Obviously, numerous modifications and variations of the present invention are possible in light of the above teachings. It is therefore to be understood that within the scope of the appended claims, the invention may be practiced otherwise than as specifically described herein.

What is claimed is:

1. A controller of a distributed type merchandise sales data processing apparatus comprising:
   a control box frame having a frame structure and including a stepped part at a front portion thereof such that a height of the control box frame is lower at a front side than at a back side thereof;
   at least one hardware component stored in the control box frame, for performing merchandise sales data processing;
   an additional frame detachably fixed to the stepped part, for making uniform a height of the front portion of the control box frame extending to a top of the additional frame and a height of a back portion of the control box frame;
   a top cover detachably fixed to cover an upper face and side faces of the control box frame; and
   a front cover detachably fixed to cover a front face of the control box frame.

2. The controller of a merchandise sales data processing apparatus according to claim 1, wherein an optical disk drive, including a tray that extends forwardly to have an optical disk placed thereon, is provided on the additional frame.

3. The controller of a merchandise sales data processing apparatus according to claim 1, further comprising a fan extending downwardly from the additional frame and coupled thereto.

4. The controller of a merchandise sales data processing apparatus according to claim 2, further comprising a fan extending downwardly from the additional frame and coupled thereto.

5. The controller of a merchandise sales data processing apparatus according to claim 1, further comprising a speaker provided on the additional frame.

6. The controller of a merchandise sales data processing apparatus according to claim 2, further comprising a speaker provided on the additional frame.

7. The controller of a merchandise sales data processing apparatus according to claim 3, further comprising a speaker provided on the additional frame.

8. The controller of a merchandise sales data processing apparatus according to claim 4, further comprising a speaker provided on the additional frame.

9. A controller structure for a merchandise sales data processing apparatus, said controller structure comprising:

a control box frame having a frame structure and including a stepped part at a front portion thereof such that a height of the control box frame is lower at a front side than a back side thereof; and at least one hardware component stored in the control box frame, for performing merchandise sales data processing;

wherein the controller structure is adapted for use in at least one of: (i) a distributed type merchandise sales data processing apparatus and (ii) an integrated type merchandise sales data processing apparatus;

wherein the distributed type merchandise sales data processing apparatus comprises:

an additional frame detachably fixed to the stepped part, for making uniform a height of the front portion of the control box frame extending to a top of the additional frame and a height of a back portion of the control box frame;

a top cover detachably fixed to cover an upper face and side faces of the control box frame; and a front cover detachably fixed to cover a front face of the control box frame; and wherein the integrated type merchandise sales data processing apparatus comprises:

a main frame having a frame structure, and including a second stepped part at a front portion thereof such that the front portion of the control box frame is lower than the back portion of the control box frame, said main frame being adapted to store the control box frame such that the control box frame is freely removable from a back face of the main frame and such that the stepped part is positioned at the second stepped part when the control box frame is stored in the main frame;

a keyboard coupled to the second stepped part of the main frame; and a display and a printer coupled to an upper portion other than the second stepped part of the main frame.

10. The controller structure according to claim 9, wherein the integrated type merchandise sales data processing apparatus further comprises at least one decorative cover for covering at least one of a front face, the back face, and side faces of the main frame.

11. The controller structure according to claim 9, wherein the distributed type merchandise sales data processing apparatus further comprises an optical disk drive, including a tray that extends forwardly to have an optical disk placed thereon, provided on the additional frame.

12. The controller structure according to claim 9, wherein the distributed type merchandise sales data processing apparatus further comprises a fan extending downwardly from the additional frame and provided thereto.

13. The controller structure according to claim 11, wherein the distributed type merchandise sales data processing apparatus further comprises a fan extending downwardly from the additional frame and coupled thereto.

14. The controller structure according to claim 9, wherein the distributed type merchandise sales data processing apparatus further comprises a speaker provided on the additional frame.

15. The controller structure according to claim 11, wherein the distributed type merchandise sales data processing apparatus further comprises a speaker provided on the additional frame.

16. The controller structure according to claim 12, wherein the distributed type merchandise sales data processing apparatus further comprises a speaker provided on the additional frame.

17. The controller structure according to claim 13, wherein the distributed type merchandise sales data processing apparatus further comprises a speaker provided on the additional frame.

* * * * *